Oct. 20, 1959     H. HODKINSON     2,909,246
DISC BRAKES

Filed June 14, 1957     4 Sheets-Sheet 1

INVENTOR
Harold Hodkinson
by Benj. T. Rauber
his attorney

United States Patent Office 2,909,246
Patented Oct. 20, 1959

2,909,246

DISC BRAKES

Harold Hodkinson, Coventry, England, assignor to Dunlop Rubber Company Limited, London, England, a British company Application June 14, 1957, Serial No. 665,835

Claims priority, application Great Britain July 27, 1956

10 Claims. (Cl. 188—73)

This invention relates to disc brakes for vehicles and more particularly relates to an improved disc brake construction for motor vehicles.

The object of the present invention is to provide an improved disc brake in which means are provided to enable the friction pads to be easily removed.

According to the present invention a disc brake comprises a rotatable disc, a non-rotatable caliper straddling a portion of the periphery of the disc, a guide formed in at least one limb of said caliper, a friction pad slidable in said guide, a piston and cylinder or like mechanism operable to force said pad into frictional engagement with said disc and a member detachably secured to said caliper and associated with said friction pad, removal of said member from said caliper being adapted also to withdraw said friction pad from said guide.

Preferably guides comprising apertures are provided in each of the caliper limbs and extend radially clean through said limb and the two ends of the caliper are integrally connected by a bridge piece extending circumferentially adjacent the periphery of the disc. Slidable pads of rectangular shape are provided for each of said guides and a piston and cylinder or like mechanism is located on each side of the disc to force said pads inwardly into contact with the disc. A bracket is releasably secured to the bridge piece, said bracket being provided with slots which accommodate a member detachably secured to each friction pad in such a manner that, on removal of the bracket, the members and friction pads are also withdrawn from the caliper.

Figure 1:
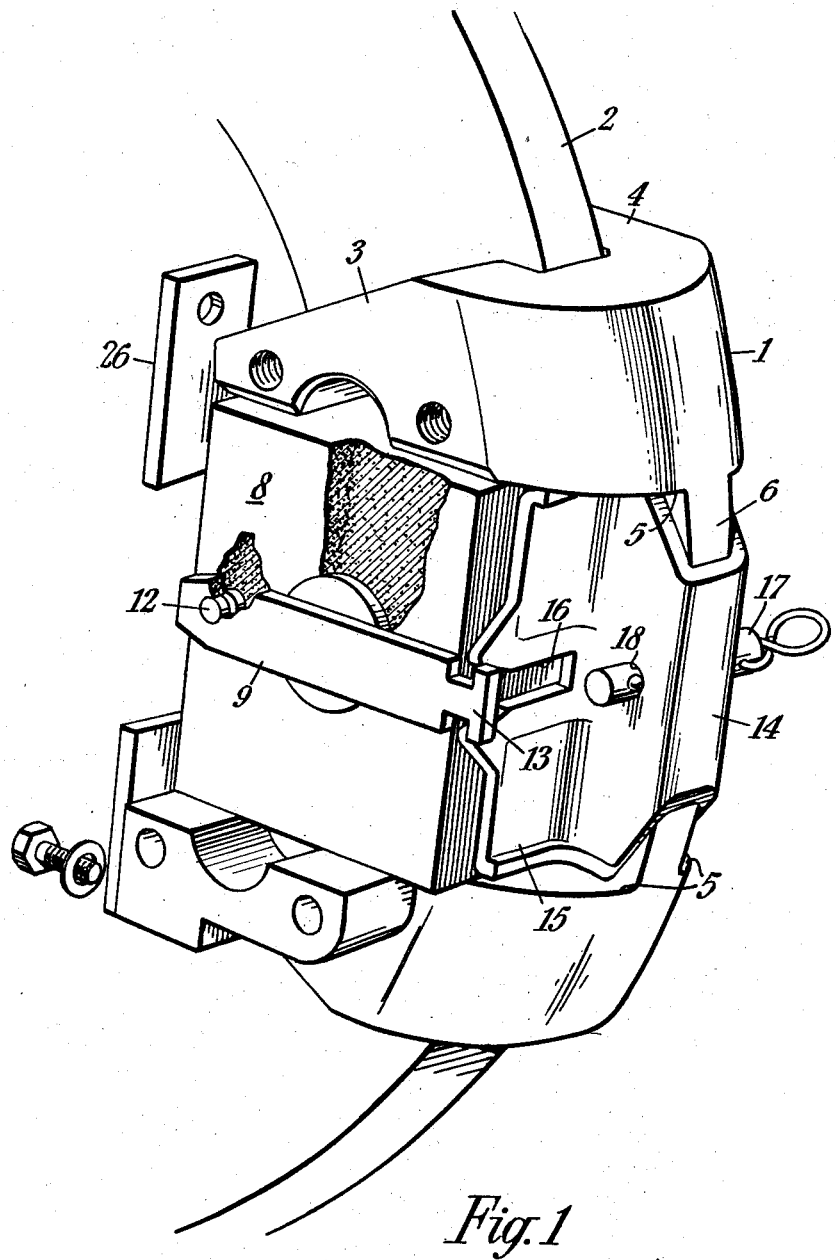
Figure 2:
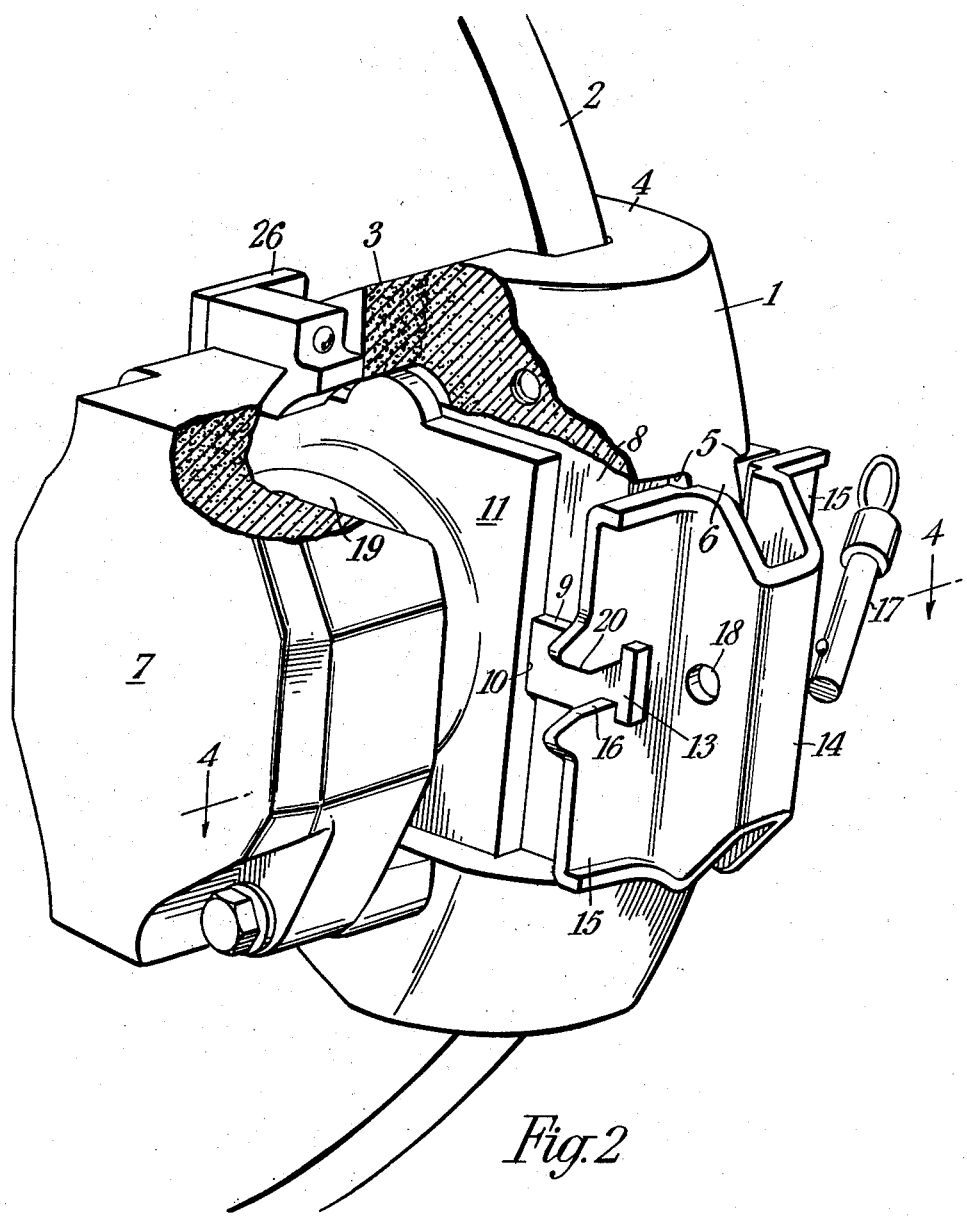
Figure 3:
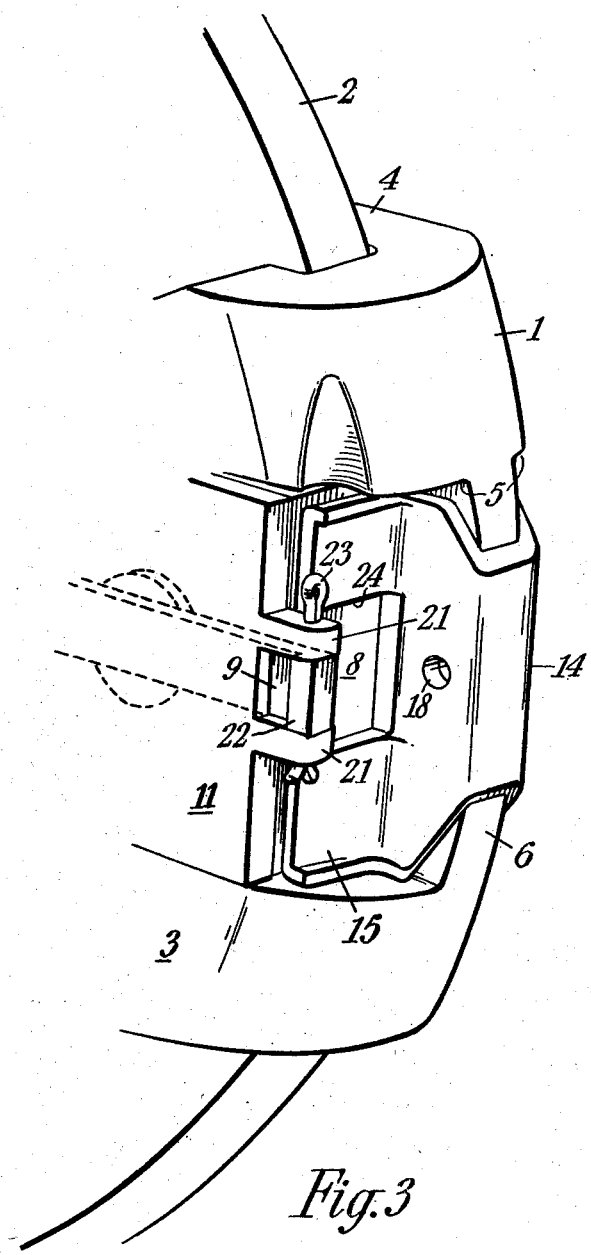
Figure 4:
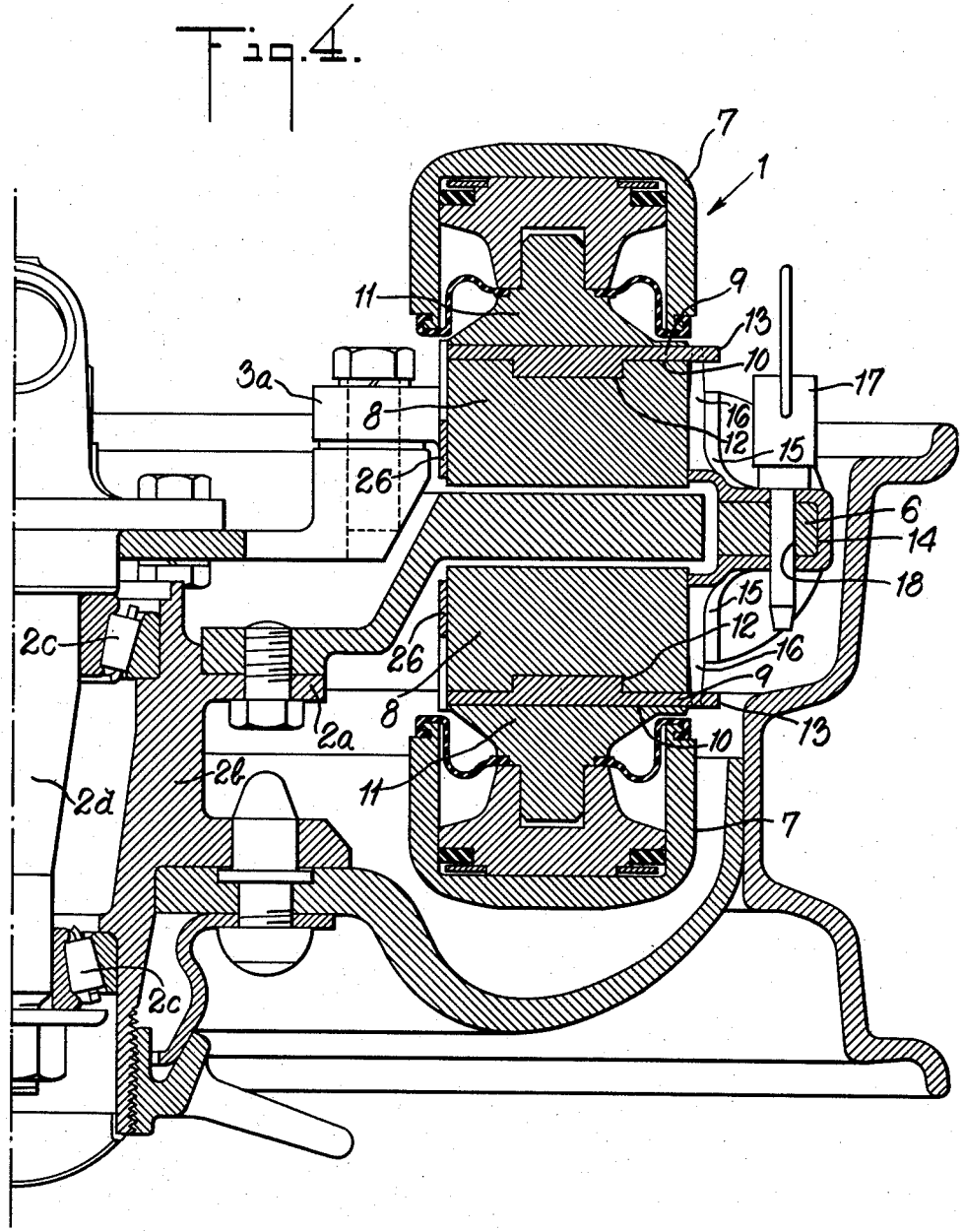

A better understanding of the invention may be obtained from the following description when this is read with reference to the accompanying drawings, of which:

Figure 1 is a part-sectional perspective view of portion of a disc brake incorporating the invention, Figure 2 is a view similar to Figure 1 and showing parts thereof in a different position, Figure 3 is a similar view of a portion of Figure 1 or 2 showing a modification thereof, and Fig. 4 is a section on the line 4—4 of Fig. 2 showing also the means for attaching the brake to a vehicle.

In the embodiment of the present invention shown in Figures 1, 2 and 4, a non-rotatable caliper 1, which straddles a portion of the outer periphery of the disc 2 and covers a minor portion only of the braking surfaces, is provided centrally of each limb 3, 4 with an aperture 5 of rectangular section which extends clean through each of said limbs 3, 4 so that the only portion joining the two circumferentially-spaced ends of the caliper 1 is a bridge piece 6 which extends circumferentially adjacent and in line with the outer periphery of the disc 2. The cylinder 7 of a fluid-pressure operated piston and cylinder mechanism is bolted to the circumferentially-spaced ends of the caliper-limbs 3, 4 on each side of said disc 2, and this mechanism is adapted to force rectangular pads 8 of friction material, slidably located between said ends, into frictional contact with the braking surfaces of the disc 2.

On one side of the disc each of the limbs 3, 4 is extended radially inwardly to form a pair of ears 3a (Fig. 4) each of which is bolted to a non-rotatable portion 3b of the vehicle. The disc 2 is bolted to a radial flange 2a of the wheel hub 2b which is rotatable on bearings 2c about the front wheel axle 2d. In the case of the rear wheel, the hub 2c is secured directly to the axle.

A thin metal strip 9 is located in a groove 10 formed in a backing plate 11 associated with each friction pad 8 on the side thereof adjacent the disc 2 and is pegged or dowelled to the pad 8 as at 12. The strip 9 extends parallel with the parallel sides of the aperture 5 in which the pad 8 is located and the upper end of the strip 9, i.e. the end adjacent the bridge piece 6 of the caliper 1, projects from the upper edge of the pressure plate 11 and is formed as a T 13, the cross-piece thereof being normal to the major axis of the strip 9.

A bracket 14 of substantially U-section is provided to enclose the bridge piece 6 of the caliper 1 and to be located in the apertures 5 of the caliper limb 3, 4 on each side of the disc 2. The bracket 14 is formed with axially-outwardly projecting flanges 15 which form abutments to prevent movement of the friction pads 8 radially-outwardly of the apertures 5. An abutment 26 is also secured to the inner ends of the caliper limbs 3 and 4 to prevent movement of the pads 8 in a radially-inward direction. Each of the flanges 15 of the bracket 14 is provided intermediate its ends and in line with the upright of the T 13 on the metal strip 9, with a slot 16 extending axially inwardly from its outer edge and towards the bridge-piece 6, and of a width sufficient to accommodate the upright of the T 13. The bracket 14 is releasably secured to the bridge piece 6 by a quick-release pin 17 which extends axially through holes 18 provided in the bracket 14 and bridge piece 6.

As the friction pads 8 wear, during operation of the brake, the upright of each T 13 enters the associated slot 16 in the bracket, the cross-piece thereof being located above the slot 16, until, when the pads 8 are fully worn the T 13 is located at the inner end of the slot 16. The pads 8 may be withdrawn from the caliper 1 by removing the quick-release pin 17 and withdrawing the bracket 14 radially outwardly from the caliper 1. This withdraws the metal strips 9 and the pads 8 to which they are pegged. New pads can then be fitted to the strips 9, the opposed pistons 19 forced apart by means of a pair of tongs, and the new pads 8 and the bracket 14 refitted to the caliper.

With new pads 8, the T 13 of the metal strips 9 may be spaced a short distance outwardly of the end of the slots 16 in the bracket 14, as shown in Figure 1, and preferably the ends of the slots 16 are provided with a substantial lead 20 to correctly align the T 13 as wear takes place.

The slots 16 may be calibrated or so marked as to visually indicate the wear of the pads 8.

Preferably the rectangular backing plates 11 are slidably interposed in the apertures 5 between the piston 19 and the friction pad 8. However, this is not essential, and the metal strips 9 may be disposed in slots cut directly into the rear face of the pads 8 and be pegged thereto.

In a modification of the invention (Figure 3), the backing plate 11 is provided with a pair of spaced-apart lugs 21 and the metal strip 9 is provided with a boss 22 which is located between said lugs 21 and secured thereto by a split pin 23. The slots 24 in the bracket 14 are wide enough to accommodate the lugs 21 and the ends of the split pin 23 act as the cross-piece of the T 13, hereinabove described, to withdraw the pads 8 when the bracket 14 is removed.

Having now described my invention—what I claim is:

1. A disc brake comprising a rotatable disc adapted to be secured to a rotatable portion of a vehicle, a non-rotatable caliper adapted to be secured to a non-rotatable portion of a vehicle and comprising a pair of circumferentially spaced caliper portions each straddling a portion of the periphery of the disc and having opposed limbs extending substantially radially inwardly adjacent the opposite radial surfaces of said disc, said caliper portions being joined together by an integral bridge member extending circumferentially of said disc adjacent the outer periphery thereof and having an axial width no greater than the axial width of said disc, a guide formed between the limbs on at least one side of said disc, a friction pad slidable substantially radially of said disc in said guide, a piston and cylinder mechanism associated with said guide and operable to force said friction pad axially therein into frictional engagement with the adjacent side of said disc, and a member movable radially between said caliper portions and detachably secured to said caliper and engaging said friction pad so that withdrawal of said member radially outwardly from said caliper when detached therefrom also withdraws said friction pad from said guide.

2. A disc brake according to claim 1 wherein one said guide, friction pad and piston and cylinder mechanism is disposed at each side of said disc and said member is associated with both said friction pads.

3. A disc brake according to claim 1 wherein said detachable member comprises a U-sectioned bracket adapted to straddle the periphery of said bridge piece and to be detachably secured thereto.

4. A disc brake according to claim 3 in which said member detachably secured to said caliper comprises a metal strip secured to said friction pad and extending radially-outwardly therefrom into axially slidable engagement with said bracket.

5. A disc brake according to claim 4 comprising axially-outwardly directed flanges on said bracket each having an axial slot formed substantially medially thereof, and an abutment adjacent the radially-outer end of said metal strip, said strip being adapted to slide in said slot with said abutment engaging the radially-outer face of its associated flange.

6. A disc brake according to claim 5 wherein said abutment comprises a T-shaped head portion of said strip.

7. A disc brake according to claim 5 wherein said abutment comprises the opposite ends of a pin passed through an aperture formed in the radially-outer end of said strip and through a pair of ears extending radially-outwardly of a pressure plate associated with said friction pad.

8. A disc brake according to claim 1 comprising a pin passed axially through said caliper and said member to secure said detachable member to said caliper.

9. The disc brake of claim 1 in which said piston and cylinder mechanism comprises a cylinder block spanning and joining the limbs of said caliper.

10. The disc brake of claim 1 having an abutment secured to a limb of said caliper at the radially inner side of said friction pad.

References Cited in the file of this patent

UNITED STATES PATENTS

| 2,762,460 | Butler | Sept. 11, 1956 |

FOREIGN PATENTS

| 742,338 | Great Britain | Dec. 21, 1955 |
| 761,479 | Great Britain | Nov. 14, 1956 |